(12) United States Patent
Yamashita

(10) Patent No.: US 8,290,307 B2
(45) Date of Patent: Oct. 16, 2012

(54) IMAGE FORMING APPARATUS AND RECORDING MEDIUM

(75) Inventor: Tomohito Yamashita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 635 days.

(21) Appl. No.: 12/133,995

(22) Filed: Jun. 5, 2008

(65) Prior Publication Data

US 2008/0304768 A1 Dec. 11, 2008

(30) Foreign Application Priority Data

Jun. 5, 2007 (JP) ................................. 2007-149608

(51) Int. Cl.
*G06K 9/32* (2006.01)

(52) U.S. Cl. ..... 382/298; 348/222.1; 358/1.1; 358/1.16; 358/1.18; 358/1.2; 358/2.1; 358/296; 358/401; 358/450; 358/453; 358/462; 382/131; 382/176; 382/197; 382/229; 382/284; 382/296; 382/297; 399/14; 399/184; 399/79

(58) Field of Classification Search .......................... None
See application file for complete search history.

(56) References Cited

U.S. PATENT DOCUMENTS

| | | | | |
|---|---|---|---|---|
| 4,707,126 A * | 11/1987 | Ohshima et al. | ................. | 399/14 |
| 5,113,229 A * | 5/1992 | Higashio et al. | ............... | 399/184 |
| 5,475,475 A * | 12/1995 | Kohtani et al. | ................. | 399/79 |
| 5,530,560 A * | 6/1996 | Nakajima | ..................... | 358/453 |
| 5,694,486 A * | 12/1997 | Shigeeda et al. | .............. | 382/197 |
| 5,930,006 A * | 7/1999 | Yoshida et al. | ............... | 358/450 |
| 5,940,543 A * | 8/1999 | Isemura et al. | ............... | 382/284 |
| 6,014,459 A * | 1/2000 | Taira et al. | ..................... | 382/176 |
| 6,084,988 A * | 7/2000 | Kanno et al. | ................... | 382/289 |
| 6,144,777 A * | 11/2000 | Tada et al. | ..................... | 382/284 |
| 6,263,118 B1 * | 7/2001 | Kanno et al. | ................... | 382/289 |
| 6,304,681 B1 * | 10/2001 | Akiba et al. | .................. | 382/297 |
| 6,427,058 B1 * | 7/2002 | Akiba et al. | ..................... | 399/82 |
| 6,563,961 B1 * | 5/2003 | Murayama | ..................... | 382/296 |
| 6,690,492 B2 * | 2/2004 | Nakajima | ....................... | 358/462 |
| 7,305,619 B2 * | 12/2007 | Kaneda et al. | ................ | 715/273 |
| 7,574,030 B2 * | 8/2009 | Fors et al. | ..................... | 382/131 |
| 2003/0076539 A1 * | 4/2003 | Nakajima | ....................... | 358/2.1 |
| 2003/0107767 A1 * | 6/2003 | Ishizaki | ....................... | 358/1.18 |
| 2005/0207675 A1 * | 9/2005 | Fuchigami et al. | ........... | 382/298 |
| 2007/0092162 A1 * | 4/2007 | Keithley et al. | ............... | 382/298 |
| 2009/0214125 A1 * | 8/2009 | Okumura | ...................... | 382/229 |
| 2009/0256924 A1 * | 10/2009 | Lee et al. | .................... | 348/222.1 |
| 2010/0073693 A1 * | 3/2010 | Lee et al. | ....................... | 358/1.2 |

FOREIGN PATENT DOCUMENTS

| | | |
|---|---|---|
| JP | 06-6574 A | 1/1994 |
| JP | 7-148990 A | 6/1995 |
| JP | 2002-359738 A | 12/2002 |
| JP | 2004-25750 A | 1/2004 |
| JP | 2004-289232 A | 10/2004 |

* cited by examiner

*Primary Examiner* — Tsung-Yin Tsai

(74) *Attorney, Agent, or Firm* — Birch, Stewart, Kolasch & Birch, LLP

(57) ABSTRACT

The maximum number of scaled images formed for one document and the scaling ratio set for each of scaled images are accepted by an operation panel, the basic scaling ratio is read from a table defining the scaled image arrangement information and the like, the scaling ratio of the original image data obtained by an image reading section is changed, and scaled images laid out on one sheet are generated. The generated plurality of scaled images are arranged according to the arrangement information defined by the table, and image formation is performed by an image forming section, thereby obtaining a multi-shot copy in which a plurality of images of different scaling ratio are laid out on one sheet.

11 Claims, 12 Drawing Sheets

DOCUMENT SIZE
(UNDEFINED FORM)

A4 SHEET SIZE

FIG. 9

| | THE NUMBER OF MULTI-SHOT IMAGES | | |
|---|---|---|---|
| THE NUMBER OF READ DOCUMENTS | 1 | 2~4 | 5~16 |
| 1 | A0<br>DIVISION: 1<br>BASIC SCALE: 100% | A0, A1, A2, A3<br>DIVISION: 4<br>BASIC SCALE: 50% | A0-A15 (4x4 grid)<br>DIVISION: 16<br>BASIC SCALE: 25% |
| 2 | A0, A1 (2 cells)<br>DIVISION: 4<br>BASIC SCALE: 50% | A0, A1, B0, B1<br>DIVISION: 4<br>BASIC SCALE: 50% | A0-A7, B0-B7<br>DIVISION: 16<br>BASIC SCALE: 25% |
| 3 OR 4 | A0, B0, C0, D0<br>DIVISION: 4<br>BASIC SCALE: 50% | A0,A1,B0,B1 / A2,A3,B2,B3 / C0,C1,D0,D1 / C2,C3,D2,D3<br>DIVISION: 16<br>BASIC SCALE: 25% | A0…A3 B0…B3 / … / A12…A15 B12…B15 / C0…C3 D0…D3 / … / C12…C15 D12…D15<br>DIVISION: 64<br>BASIC SCALE: 12.5% |

United States Patent US 8,290,307 B2

IMAGE FORMING APPARATUS AND RECORDING MEDIUM

CROSS-REFERENCE TO RELATED APPLICATIONS

This Nonprovisional application claims priority under 35 U.S.C. §119(a) on Patent Application No. 2007-149608 filed in Japan on Jun. 5, 2007, the entire contents of which are hereby incorporated by reference.

BACKGROUND

1. Field of the Invention

The present application relates to an image forming apparatus capable of laying out a plurality of images of different scaling ratios on one sheet and a recording medium storing a computer program for causing a computer to form a plurality of images of different scaling ratios on one sheet.

2. Description of the Related Art

Conventionally, when intending to take a plurality of copies of one or a plurality of sheets of documents, to obtain desired copy images, the user sets the scaling ratio and the like, and takes a copy (trial copy) of only one sheet at first. Then, after confirming that the image is copied at the desired-scaling by checking the output result (copy image), the user takes copies of the remaining sheets.

Japanese Patent Laid-Open No. 2004-25750 discloses to print, on one sheet, a plurality of trial images corresponding to a plurality of print parameter values, respectively, based on the same input image.

However, the print parameter values described in Japanese Patent Laid-Open No. 2004-25750 are hue, chroma, brightness, and sharpness, and no scaling ratio is set. Therefore, when the input image is a document of a nonstandard size and is printed on a sheet of a size (for example, a standard size such as A4 or B5) different from that of the document, when the output result is unsatisfactory, it is necessary to repeat once again an operation of changing the scaling ratio setting and performing trial copying.

In particular it is difficult to set an image read from a document of a nonstandard size, at a scaling ratio optimum for arranging the image in a size suitable for a sheet of a different size. The setting change requires time and trouble corresponding to the number of repetitions required until an optimum scaling ratio is found, and this increases the waste of transfer sheets, toner and the like.

Even in a case where the document is standard-sized, for example, an A4-size transfer sheet is used for an A3-size document, although reduced copying of (A4 size length/A3 size length) can be easily performed by using a widely known automatic scaling ratio changing function or using a mode in which the scaling ratio is automatically inputted by inputting only the document size and the transfer sheet size, when the margin around the image area of the document is large, it is difficult to form a copy image in the entire area of an A3-size transfer sheet.

SUMMARY OF THE INVENTION

The present application is made in view of the above-mentioned circumstances, and an object thereof is to provide an image forming apparatus capable of facilitating scaling ratio setting by generating a plurality of images of different scaling ratios from an image having been read and forming the generated images on one sheet, and a recording medium storing a computer program for causing a computer to generate a plurality of images of different scaling ratios from inputted image and form the generated plurality of images on one sheet.

An image forming apparatus according to the present application is provided with: an image reading section for reading an image from one or a plurality of documents, an image generating section for generating a plurality of images of different scaling ratios from the image read by the image reading section and an image forming section for forming the plurality of images generated by the image generating section on one sheet.

According to the present application, an output result is obtained such that a plurality of images after the transformation of the scaling ratios can be viewed on sight.

The image forming apparatus according to the present application is further provided with an accepting section for accepting a setting related to scaling ratios and the number of images to be formed on one sheet, wherein the image generating section generates the plurality of images of the different scaling ratios based on the setting accepted by the accepting section.

According to the present application, the final scaling ratio is automatically calculated based on the set scaling ratio and the number of images formed on one sheet.

The image forming apparatus according to the present application is further provided with a setting section for setting a scaling ratio for each document to be read, wherein the image generating section enlarges or reduces the image read from each document based on the scaling ratio set by the setting section.

According to the present application, a different scaling ratio can be set for each of the plurality of documents.

The image forming apparatus according to the present application is provided with an accepting section for accepting a setting related to the number of documents, scaling ratios, and the number of images to be formed on one sheet, wherein the image generating section generates the plurality of images of the different scaling ratios based on the setting accepted by the accepting section.

According to the present application, the final scaling ratio is automatically calculated based on the number of documents in addition to the scaling ratio and the number of images set by the user.

The image forming apparatus according to the present application is further provided with a table that defines an arrangement of the plurality of images on the sheet, wherein the image forming section forms the plurality of images on one sheet according to the arrangement defined by the table.

According to the present application, since the plurality of images of the different scaling ratios are formed on one sheet according to the arrangement information registered in the table, the arrangement of the images after the transformation of the scaling ratios can be changed by editing the table.

The image forming apparatus according to the present application is further provided with an information adding section for adding identification information for identifying each image generated by the image generating section and information related to the scaling ratio of each image, to the image to be formed on the sheet.

According to the present application, the set scaling ratio can be confirmed by checking the sheet on which the image is formed.

The image forming apparatus according to the present application is further provided with a display section for displaying the identification information of each image generated by the image generating section and an accepting section for accepting a selection of one piece of identification information from the identification information displayed on the display section, wherein the image forming section forms on one sheet an image identified by the piece of identification information selected through the accepting section.

According to the present application, when image formation is performed at the desired scaling ratio selected from the sheet on which the image is formed, the scaling can be realized by selecting the piece of identification information without the user manually inputting a scaling ratio.

The image forming apparatus according to the present application is further provided with a switching section for switching between a function of generating the plurality of images of the different scaling ratios from one document and a function of generating the plurality of images of the different scaling ratios from a plurality of documents.

According to the present application, the following modes are provided: a single document mode for forming a plurality of images on one sheet for each document to place important on viewablility and a multiple document mode for forming images of a plurality of documents on one sheet at a time to save sheets, toner, and other consumables.

A recording medium according to the present application is provided with a step of causing a computer to generate a plurality of images of different scaling ratios from an inputted image and form the plurality of generated images on one sheet.

According to the present application, an output result is obtained such that a plurality of images after the transformation of the scaling ratios can be viewed on sight.

In a case according to the present application, since a plurality of images after the transformation of the scaling ratios can be viewed on one sheet, the scaling ratio for obtaining a desired scaling image can be easily confirmed. Further, even when the number of documents to be read is more than one, the scaling images of a plurality of scaling ratios for each document can be confirmed on one sheet.

In a case according to the present application, the final scaling ratio can be automatically calculated based on the set scaling ratio and the number of images formed on one sheet.

In a case according to the present application, a different scaling ratio can be set for each of a plurality of documents. This is effective when the documents have different sizes or when the margin around the copy area differs among the documents.

In a case according to the present application, the final scaling ratio can be automatically calculated based on the number of documents in addition to the scaling ratio and the number of images set by the user.

In a case according to the present application, since a plurality of images of different scaling ratios are formed on one sheet according to the arrangement information registered in the table, the arrangement of images after the transformation of the scaling ratios can be easily changed by editing the table. When a larger number of documents than the maximum number that can be disposed within one sheet are set, for the documents that cannot be disposed within the sheet, an optimum arrangement can be newly determined based on the table.

In a case according to the present application, the set scaling ratio can be confirmed by checking the sheet on which the image is formed.

In a case according to the present application, when image formation is performed at the desired scaling ratio selected from the sheet on which the image is formed, the scaling can be realized by selecting a piece of identification information without the user manually inputting a scaling ratio. For example, when a display section having a touch panel is provided, the piece of identification information the same as the piece of identification information printed together with the desired scaling image is selected from the displayed identification information and the touch panel is pressed, whereby the desired scaling ratio can be easily set.

In a case according to the present application, selection can be freely made between the single document mode for forming a plurality of images on one sheet for each document to place important on viewablility and a multiple document mode for forming images of a plurality of documents on one sheet at a time to save sheets, toner, and other consumables.

The above and further objects and features of the invention will more fully be apparent from the following detailed description with accompanying drawings.

BRIEF DESCRIPTION OF THE DRAWINGS

FIG. 9 is a conceptual diagram showing an example of a table that defines the arrangement of multi-shot images;

DETAILED DESCRIPTION OF THE INVENTION

Hereinafter, the present application will be concretely described with reference to the drawings showing an embodiment thereof.

Figure 1:
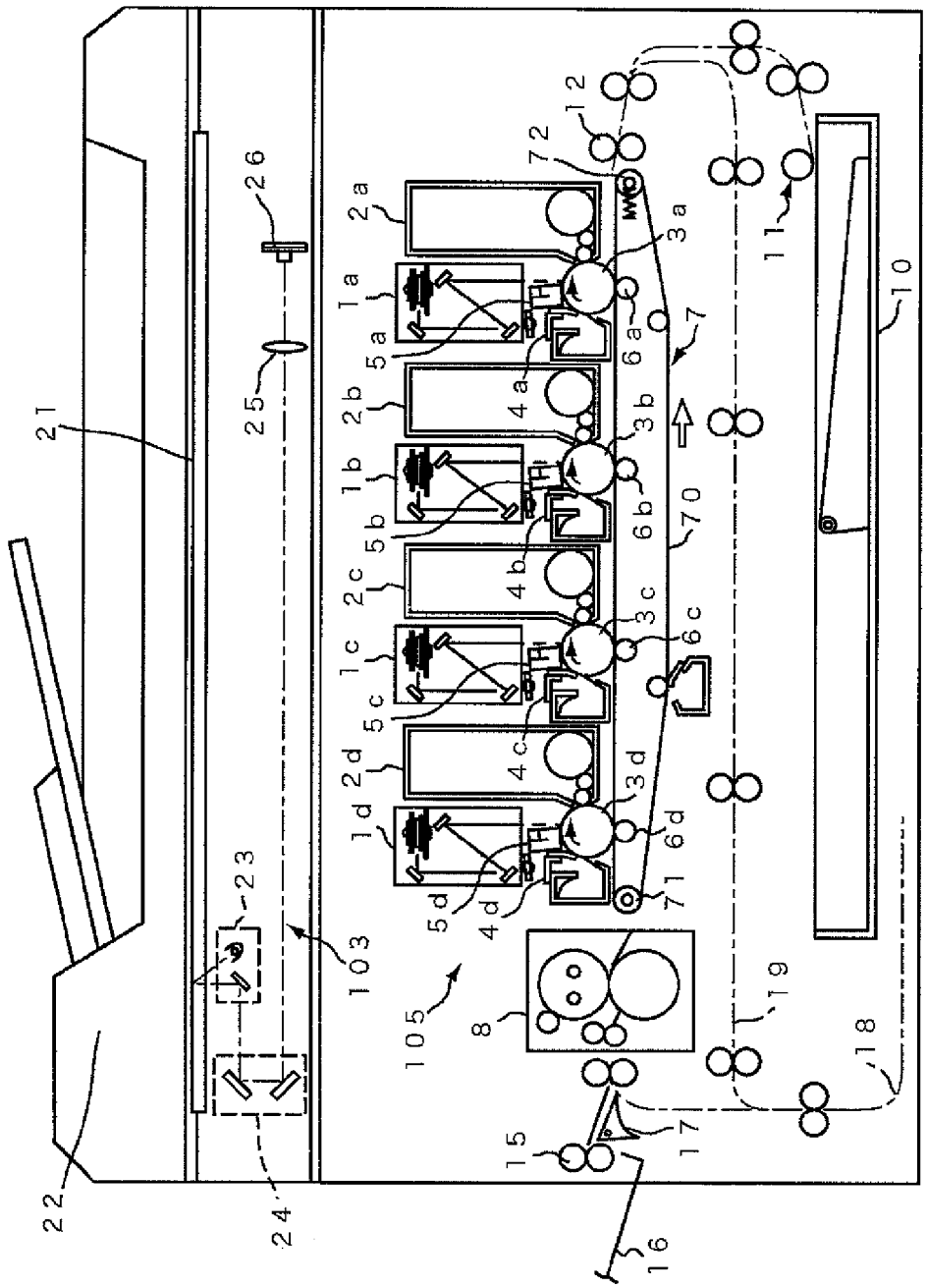
FIG. 1 is a schematic view showing the internal structure of an image forming apparatus according to an embodiment.

FIG. 1 is a schematic view showing the internal structure of an image forming apparatus according to the embodiment. A document plate 21 and an operation panel 120 described later are provided on the upper surface of the image forming apparatus body. An image reading section 103 and an image forming section 105 are provided in the image forming apparatus body.

To the upper surface of the document plate 21, a double-sided automatic document feeder 22 supported so as to be openable and closable with respect to the document plate 21 is attached in a predetermined positional relation with respect to the reading surface of the document plate 21. The double-sided automatic document feeder 22, first, transports the document so that one surface of the document faces the image reading section 103 in a predetermined position of the document plate 21, and after image reading for the surface is finished, reverses the document and transports the document toward the other document plate 21 so that the other surface of the document faces the image reading section 103 in the predetermined position of the document plate 21. Then, after image reading of both surfaces is finished for one document, the double-sided automatic document feeder 22 ejects the document, and performs the double-sided transport operation for the next document. The above-described document transport and reversal operation is controlled in association with the overall operation of the copier.

The image reading section 103 is disposed under the document plate 21 in order to road the image of the document placed on the document plate 21 or the document conveyed onto the document plate 21 by the double-sided automatic document feeder 22. The image reading section 103 includes a light source unit 23 and a mirror unit 24 that parallelly reciprocate along the lower surface of the document plate 21, an optical lens 25, and a CCD line sensor 26 which is a photoelectric conversion element.

The light source unit 23 includes a light source that emits light for reading to the surface of the document image and a mirror that reflects the reflected light image from the document in a predetermined direction. The light source unit 23 parallelly reciprocates at a predetermined scanning speed while maintaining a predetermined distance from the lower surface of the document plate 21. The mirror unit 24 includes two mirrors disposed orthogonal to each other in order to further reflect, in a predetermined direction, the reflected light image from the document reflected by the mirror of the light source unit 23. The mirror unit 24 parallelly reciprocates while maintaining a predetermined speed relation with the light source unit 23.

The optical lens 25 reduces the reflected light image from the document reflected by the two mirrors of the mirror unit 24, and forms a reduced light image in a predetermined position on the CCD line sensor 26. The CCD line sensor 26 photoelectrically converts the formed light images in succession, and outputs them as electric signals. The CCD line sensor 26 is a three-line color CCD capable of reading a black-and-white image or a color image and outputting line data in which the image is color separated into color components of R (red), G (green), and B (blue). The document image information converted into an electric signal by the CCD line sensor 26 is transferred to an image generating section 104 (see FIG. 8), and undergoes predetermined image data processing.

Next, the structure of the image forming section 105 will be described. Below the image forming section 105, a sheet feed mechanism 11 that separates sheets stacked in a sheet tray 10 one by one and feeds them to the image forming section 105 is provided. The sheets that are separated one by one and fed are transported to the image forming section 105 at the timing of transport is controlled by a pair of resist rollers 12 disposed in front of the image forming section 105.

A transfer belt mechanism 7 is disposed under the image forming section 105. The transfer belt mechanism 7 transports sheets by causing them to electrostatically adhere to a transfer belt 70 laid so as to substantially parallelly extend between a drive roller 71 and a driven roller 72. A fixing unit 8 for fixing the toner image transferred onto the sheet, on the sheet is disposed on the downstream side in the sheet transport direction. The sheet having passed through the nip between a pair of fixing rollers of the fixing unit 8 passes through a transport direction changing gate 17, and is delivered onto a delivery tray 16 attached to the housing of the image forming apparatus, by delivery rollers 15.

The transport direction changing gate 17 selectively switches the transport path of the sheet having undergone fixing, between a path to deliver the sheet to the outside of the apparatus body and a path to re-feed the sheet to the image forming section 105. When switching from the path to deliver the sheet to the outside to the path to re-feed the sheet to the image forming section 105 is made by the transport direction changing gate 17, the sheet is reversed through a switchback transport path 18, and then, re-fed to the image forming section 105 through a double-sided document transport path 19.

Over the transfer belt mechanism 7, image forming stations that form toner images of black, cyan, magenta, and yellow are placed in this order from the upstream side of the sheet transport path in the proximity of the transfer belt 70. The transfer belt 70 is frictionally driven by the drive roller 71 in a direction of the hollow arrow of the figure, carries the sheet fed by the sheet feed mechanism 111 as described above, and transports the sheet to the image forming stations of the colors in succession.

The image forming stations of the colors have substantially the same structure. For example, the image forming station that forms toner images of black includes an exposure unit $1a$, a developer unit $2a$, a photoconductor drum $3a$, a cleaner unit $4a$, and a charger $5a$.

The exposure unit $1a$ includes: a semiconductor laser element (not shown) that emits dot light modulated according to the image data; and an f$\theta$ lens and a mirror for image focusing on the surface of the photoconductor drum $3a$, the laser beam for deflecting the laser beam from the semiconductor laser element in a main scanning direction. An image signal corresponding to a black component image of a color document image is inputted to the exposure unit $1a$. Thereby, an electrostatic latent image corresponding to the color-converted document image information is formed on the photoconductor drum $3a$.

The developer unit $2a$ contains black toner. The electrostatic latent image on the photoconductor drum $3a$ is generated by the black toner. The cleaner unit $4a$ removes and collects the toner remaining on the photoconductor drum $3a$ after the electrostatic latent image formed on the surface of the photoconductor drum $3a$ is developed and transferred onto a sheet. The charger $5a$ uniformly charges the surface to the photoconductor drum $3a$ at a predetermined potential. As the charger $5a$, a roller type or a brush type that is in contact with the photoconductor drum $3a$, or a charger type that is not in contact with the photoconductor drum $3a$ is used.

The black toner image formed on the photoconductor drum $3a$ is transferred onto a sheet that is transported while adhering onto the transfer belt 70, by the action of a transfer roller $6a$ disposed so as to be opposed to the photoconductor drum $3a$ with the transfer belt 70 in between.

The same applies to the image forming stations of the colors other than black. The image forming stations for cyan, magenta, and yellow respectively include: exposure units $1b$, $1c$, and $1d$; developer units $2b$, $2c$, and $2d$; photoconductor drums $3b$, $3c$, and $3d$; cleaner units $4b$, $4c$, and $4d$; and chargers $5b$, $5c$, and $5d$. The toner images of the colors formed on the photoconductor drums $3b$, $3c$, and $3d$ are successively transferred onto a sheet that is transported while adhering onto the transfer belt 70, by the action of transfer rollers $6b$, $6c$, and $6d$, thereby forming a color image.

Figure 2:
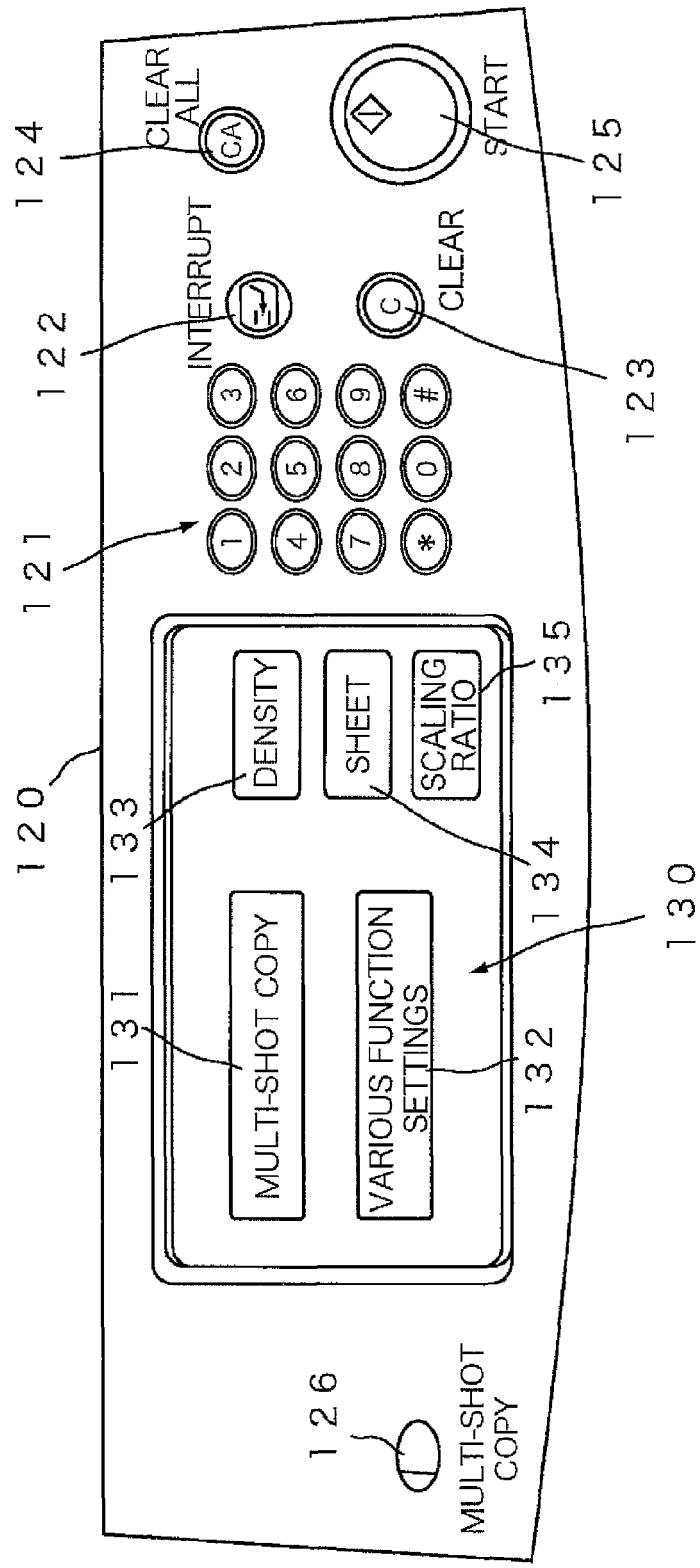
FIG. 2 is a schematic view showing an example of an operation panel.

FIG. 2 is a schematic view showing an example of the operation panel 120. The operation panel 120 includes an operation section for accepting various operations by users and a display section for displaying information that users is to be notified. A liquid crystal display 130 (hereinafter, referred to as LCD 130) having a touch panel is disposed substantially in the center of the operation panel 120. On the right side thereof, a numeric keypad 121, an interrupt key 122, a clear key 128, a clear all key 124, and a start key 125 are disposed. On the left side of the LCD 130, a multi-shot copy key 126 is disposed.

Various screens among which switching is made are displayed on the LCD 130. On these screens, touch keys for setting various functions are disposed. By directly pressing the touch keys with a finger, various function settings can be made. Operation guidance, warnings, and the like are also displayed on the LCD 130. On the screen shown in FIG. 2, touch keys 131 to 135 associated with multi-shot copying, various function setting, density setting, sheet setting, and scaling ratio setting are disposed. The user can make the settings of the items by directly pressing the keys with his or her finger.

Among the keys disposed on the right side of the LCD 130, the numeric keypad 121 is used for inputting numeric values and the like on the screen of the LCD 130. The interrupt key 122 is for temporarily suspending the currently executed image reading or image formation to allow another processing. The clear key 123 is for clearing the set value displayed on the LCD 130 and stopping the image forming operation. The clear all key 124 is for returning the setting of the image reading condition or the image formation condition to the default values. The start key 125 is for providing an instruction to start the image reading operation or the image forming operation.

The image forming apparatus according to the present embodiment has a multi-shot copy mode to form images of a plurality of scaling ratios so as to be arranged on one sheet. The operation of the image forming apparatus when the multi-shot copy key 126 disposed on the left side of the LCD 130 or the touch key 131 displayed on the LCD 130 is pressed will be described.

Figure 3A:
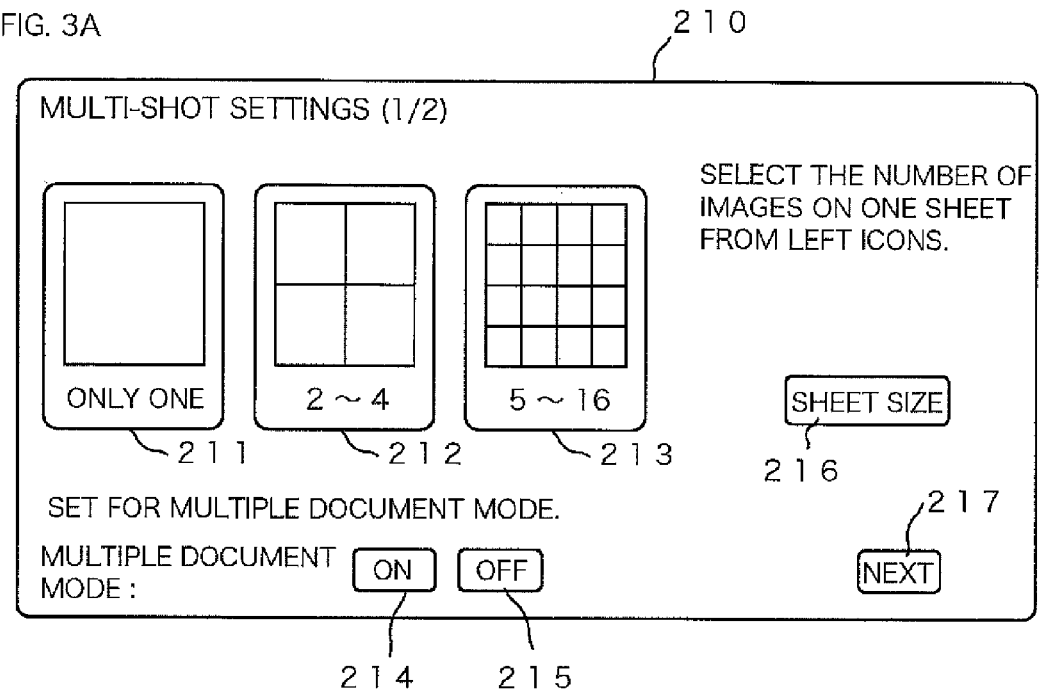
FIGS. 3A and 3B are schematic views showing an example of a screen displayed on an LCD when a multi-shot copy mode is selected.
Figure 3B:
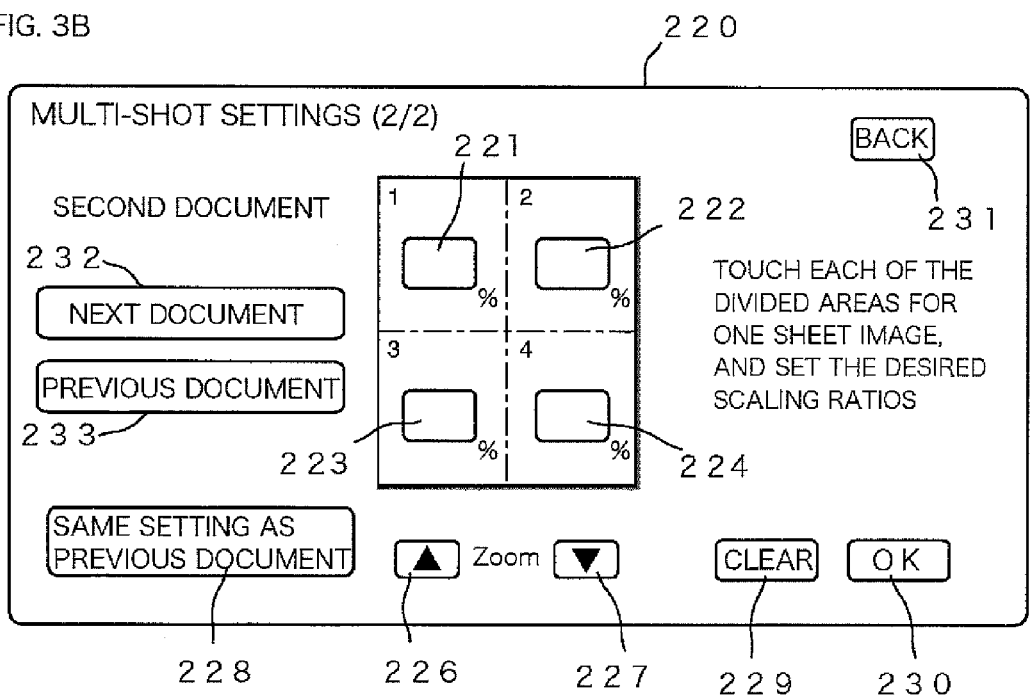

FIGS. 3A and 3B are schematic views showing an example of a screen displayed on the LCD 130 when the multi-shot copy mode is selected. When the multi-shot copy key 126 disposed on the left side of the LCD 130 or the touch key 131 displayed on the LCD 130 is pressed, first, the image forming apparatus displays a multi-shot setting screen 210 as shown in FIG. 3A on the LCD 130. On the multi-shot setting screen 210, maximum number setting keys 211 to 213, multiple document mode setting keys 214 and 215, a sheet size setting key 216, and a next screen display key 217 are disposed.

The maximum number setting keys 211 to 213 are for setting the maximum number of images to be formed on one sheet. The user who intends to perform multi-shot copying presses the maximum number setting key 211 when trying copying of a single scaling ratios per document, operates the maximum number setting key 212 when trying copying of not less than two and not more than four scaling ratios per document, and operates the maximum number setting key 213 when trying copying of not less than five and not more than sixteen scaling ratios per document. The multiple document mode setting keys 214 and 215 are for setting whether multi-shot copying is performed from a plurality of documents or not. When copying of a plurality of scaling ratios for not more than four documents is performed onto one transfer sheet in a case where the number of documents is more than one, the multiple document mode setting key 214 is operated. When copying of a plurality of scaling ratios for each of the documents is performed onto one transfer sheet in a case where the number of documents is more than one, or when the number of documents is only one, the multiple document mode setting key 215 is operated. For the sheet size, the size set by the touch key 134 of the LCD 130 is used as the sheet size for multi-shot copying. When the setting of the sheet size has not been made yet or the sheet size is to be reset, the sheet size setting key 216 is operated.

When the next screen display key 217 disposed in the lower right corner of the multi-shot setting screen 210 is pressed, the image forming apparatus displays a multi-shot setting screen 220 as shown in FIG. 3B on the LCD 130. On the multi-shot setting screen 220, scaling ratio setting keys 221 to 224, zoom keys 226 and 227, a same setting key 228, a clear key 229, an enter key 230, a previous screen display key 231, a next document setting key 232, and a previous document setting key 233 are disposed.

The scaling ratio setting keys 221 to 224 are for setting the scaling ratio of each image formed on one sheet. In the example shown in FIG. 3B, a different scaling ratio can be set for each of four kinds of images. That is, this corresponds to a case where the maximum number setting key 212 is pressed on the multi-shot setting screen 210 shown in FIG. 3A. To set the scaling ratio of each image, the user presses any of the scaling ratio setting keys 221 to 224, and then, increments or decrements the value one by one with the zoom key 226 or 227 or directly inputs a numeric value with the numeric keypad 121 disposed on the right side of the LCD 130. The clear key 229 is for clearing the inputted scaling ratio. The enter key 230 is for entering the inputted scaling ratio.

The next document setting key 232, the previous document setting key 233, and the same setting key 228 are touch keys displayed only when the multiple document mode is on. The next document setting key 232 is for setting the scaling ratio of each image for the next document. The previous document setting key 233 is for setting the scaling ratio of each image for the previous image. The same setting key 228 is for setting the same scaling ratio as those for the previous document.

Figure 4:
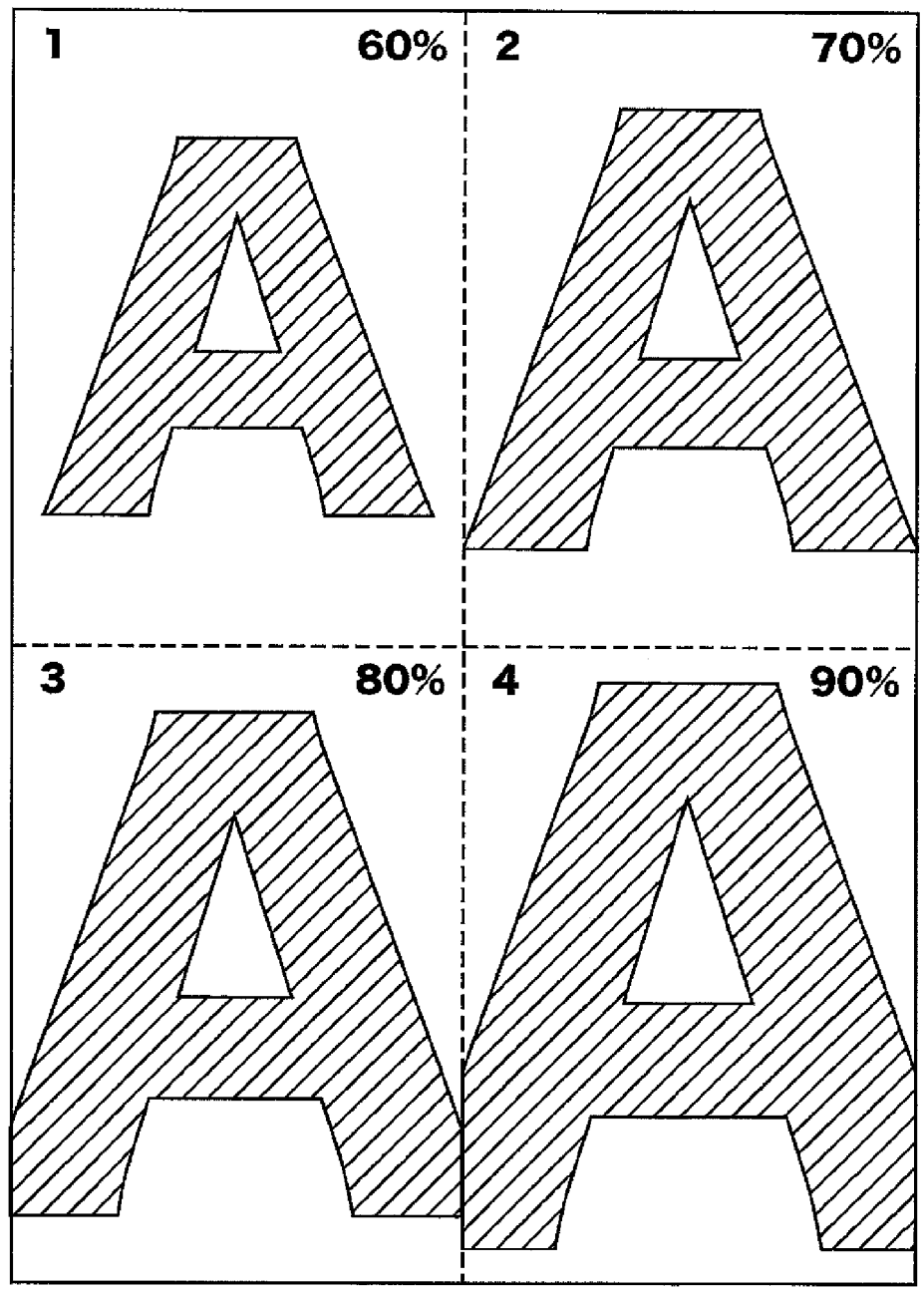
FIG. 4 is a schematic view showing an example of the print result in multi-shot copying.

The image generated by the multi-shot copying will be described. FIG. 4 is a schematic view showing an example of the print result in the multi-shot copying. FIG. 4 shows an example when the multiple document mode is off (that is, in the case of a single document mode), and is a multi-shot print result when the set maximum number of images formed for one document is four and the set scaling ratios are four kinds of 60%, 70%, 80%, and 90% in the multi-shot setting. Each of the four areas divided by the broken lines shows an actual sheet (for example, an A4-size sheet), and the image after the transformation of the scaling ratio is printed in each area. Identification information (hereinafter, referred to as index number) for identifying each of the images and the set scaling ratio are printed in an upper part of each area.

Figure 5:
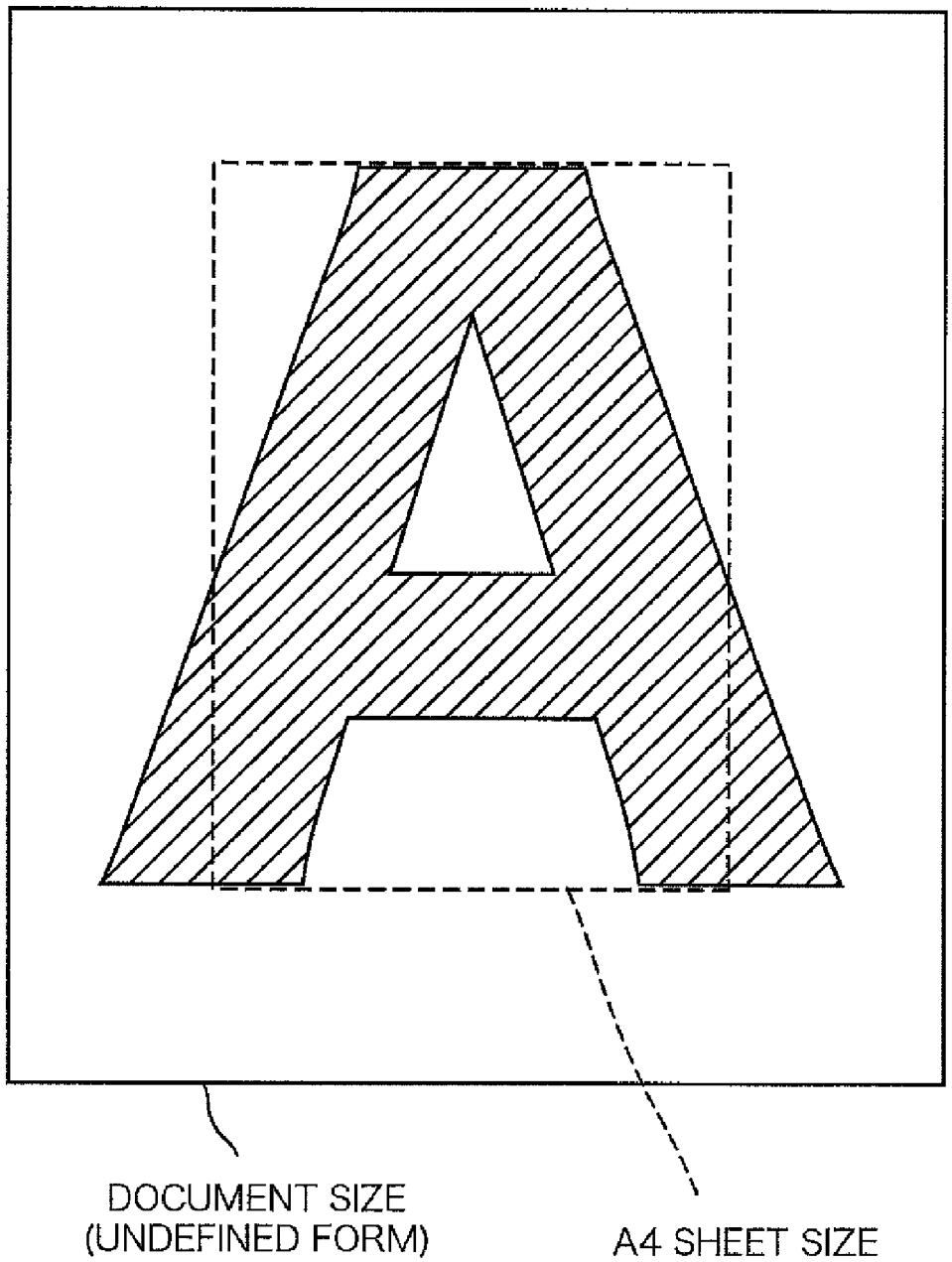
FIG. 5 is a schematic view showing a comparison between a document size and a copy sheet size.

FIG. 5 is a schematic view showing a comparison between a document size and a copy sheet size. For example, there are cases where the document image does not fall within an A4-size sheet only by changing (reducing) the size of the document to 90% of the original size. That is, when copying is performed at a scaling ratio of 90%, the result is as shown at the index number 4 in FIG. 4. However, since a plurality of images after the transformation of the scaling ratios can be seen as on one sheet at sight, the user can easily check the scaling ratio for obtaining an image having the desired scaling ratio. That is, the user selects one desired image from among images of four scaling ratios. For example, in the image of a scaling ratio of 90% with the index number 4 printed therein, the document partly lies outside the frame. That is, when normal copying is actually performed at a scaling ratio of 90%, part of the document is not printed like this, which seems inappropriate for many users. Moreover, the image with the index number 1 seems to be judged inappropriate by many users because the margin around the document image is too large.

Anyway, the user performing multi-shot copying may freely select a desired image from among these images of four scaling ratios.

Figure 6:
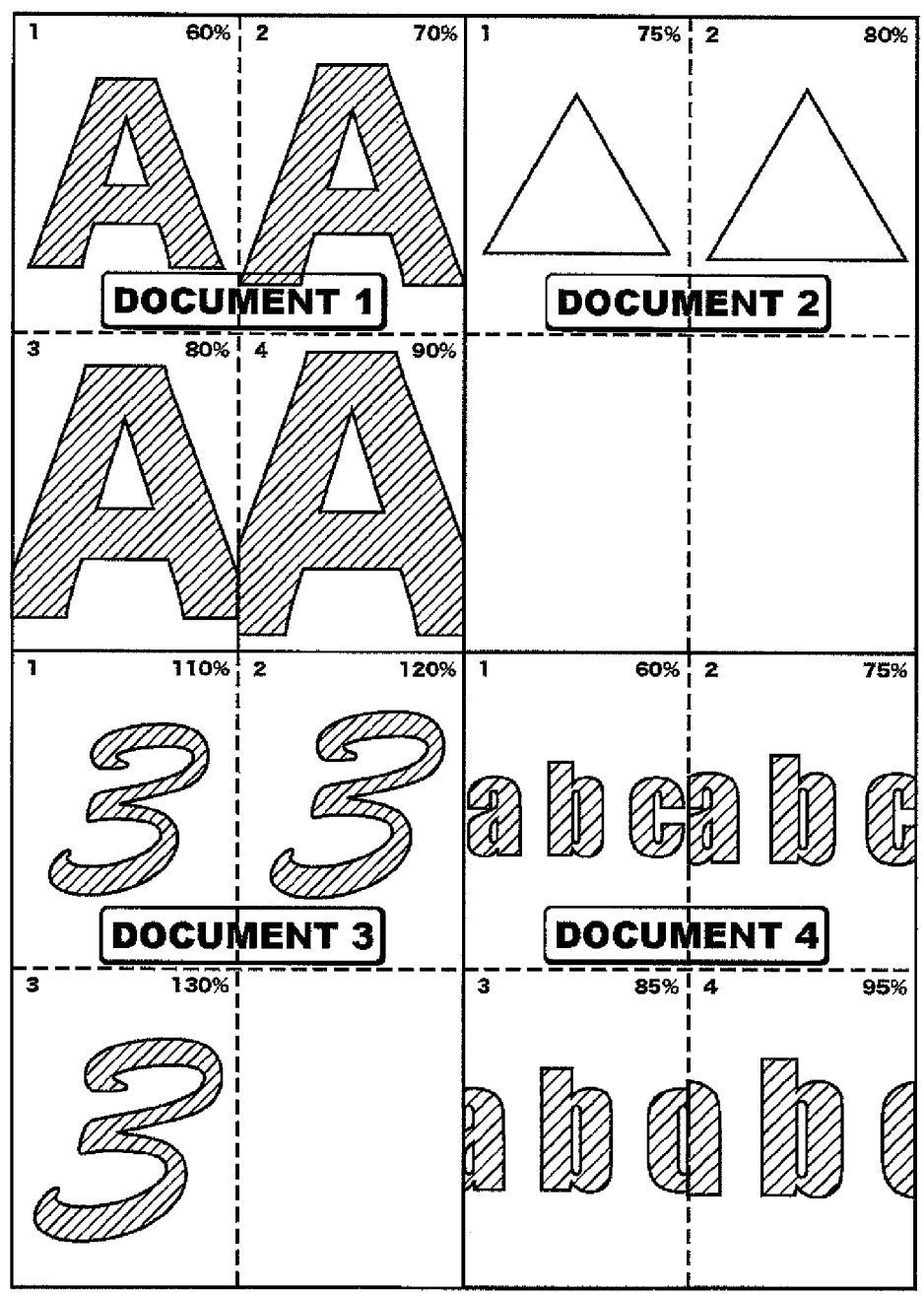
FIG. 6 is a schematic view showing another example of the print result in multi-shot copying.

FIG. 6 is a schematic view showing another example of the print result in the multi-shot copying. FIG. 6 shows an example when the multiple document mode is on, and is a multi-shot print result when in the multi-shot setting, the set maximum number of images is two to four, the set scaling ratios for the first document are four kinds of 60%, 70%, 80%, and 90%, the set scaling ratios for the second document are two kinds of 75% and 80%, the set scaling ratios for the third document are three kinds of 110%, 120%, and 130%, and the set scaling ratios for the fourth document are four kinds of 60%, 75%, 85%, and 95%. Each of the four areas divided by the solid lines shows multi-shots of each document, and an index for identifying the document is printed in each multi-shot. Each of the four areas further divided by the broken lines in the multi-shots of each document shows an actual sheet (for example, an A4-size sheet), and the scaled image is printed in each area. As in the case of the single document mode, identification information (hereinafter, referred to as index number) for identifying each of the images and the set scaling ratio are printed in an upper part of each area.

Figure 7A:
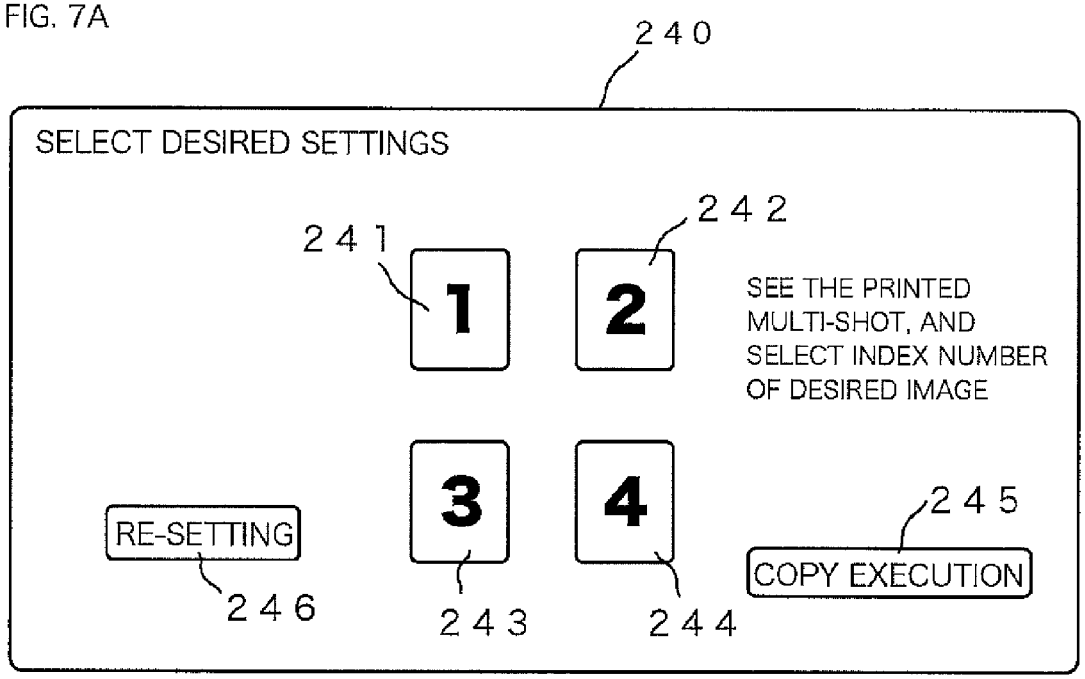
FIGS. 7A and 7B are schematic views showing an example of an index number selection screen displayed on the LCD when an image having desired scaling ratio is outputted from a multi-shot copy.
Figure 7B:
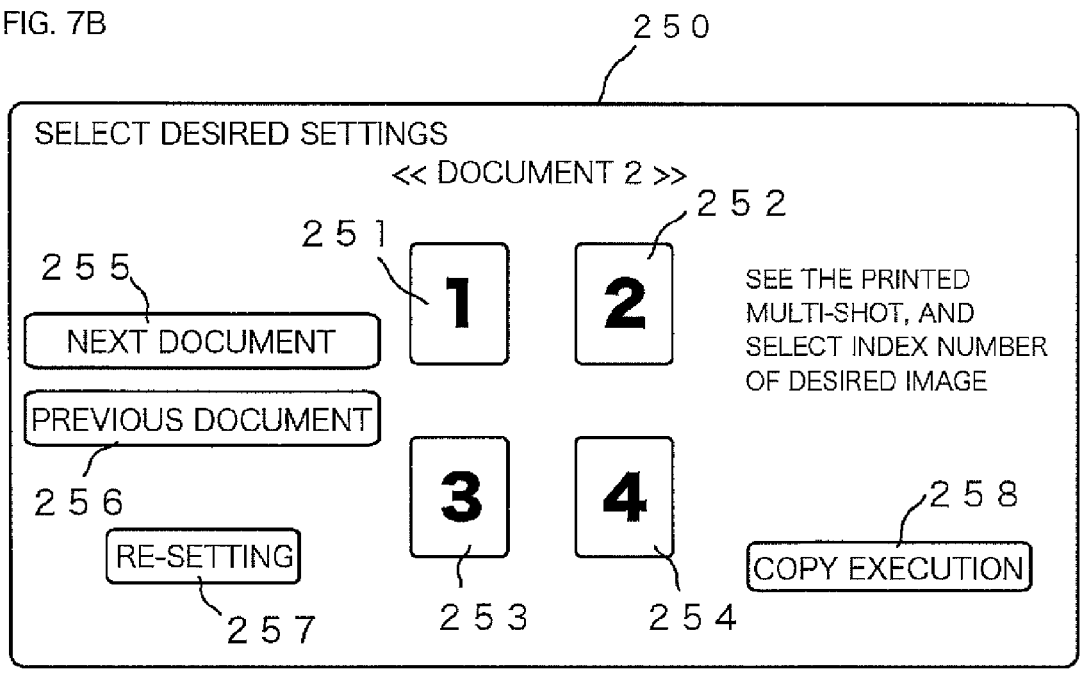

Next, the operation of the image forming apparatus when a desired scaled image is outputted from a multi-shot copy will be described. FIGS. 7A and 7B are schematic view showing an example of an index number selection screen displayed on the LCD 130 when an image having desired scaling ratio is outputted from a multi-shot copy. FIG. 7A shows an index number selection screen 240 in the single document mode. On this index number selection screen 240, index number selection keys 214 to 244, a copy execution key 245, and a re-setting key 246 are disposed.

The index number selection keys 241 to 244 correspond to the index numbers printed in the multi-shot copy. By pressing one of the index number selection keys 241 to 244, the user can set the scaling ratio. When none of the images of the multi-shot copy is an image of the desired size, the scaling ratio can be re-set by pressing the re-setting key 246. When the re-setting key 246 is pressed, the image forming apparatus displays the multi-shot setting screen 210 shown in FIG. 3A. When the copy execution key 245 is pressed after an index number is selected, the image forming apparatus generates a scaled image by using the scaling ratio used to generate the scaled image of the selected index number, and forms the generated image on the sheet.

FIG. 7B shows an index number selection screen 250 in the multiple document mode. On the index number selection screen 250, index number selection keys 251 to 254, a copy execution key 258, and a re-setting key 257 are disposed as in the case of the single document mode. In addition to these keys, a next document setting key 255 and a previous document setting key 256 are disposed. The next document setting key 255 and the previous document setting key 256 are pressed when a scaled image is outputted by using the scaling ratio of another document printed in the multi-shot copy.

Figure 8:
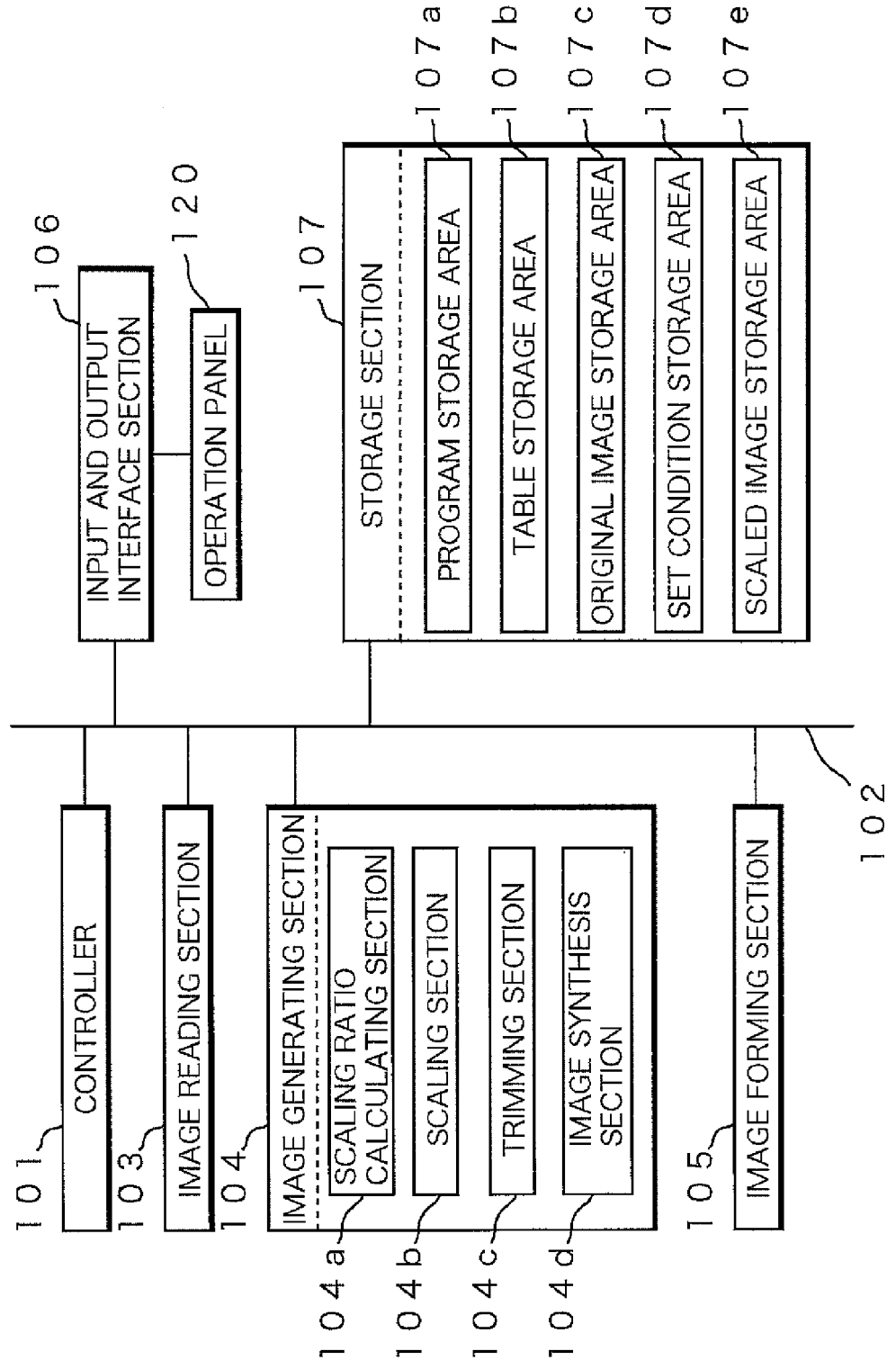
FIG. 8 is a block diagram for explaining the structure of the control system of the image forming apparatus according to the present embodiment.

Next, the structure of the control system of the image forming apparatus will be described. FIG. 8 is a block diagram for explaining the structure of the control system of the image forming apparatus according to the present embodiment. The image forming apparatus includes a controller 101, the image reading section 103, the image generating section 104, the image forming section 105, an input and output interface 106, and a storage section 107. These elements are connected together through a bus 102.

The controller 101 includes a CPU, a ROM, and a RAM, and controls the entire apparatus to thereby realize the multi-shot copying function as described above. The image reading section 103 includes the light source unit 23, the mirror unit 24, and the CCD line sensor 26 as shown in FIG. 1. The image reading section 103 optically reads the image from the document placed on the document plate 21 or the document set in the double-sided automatic document feeder 22.

The image generating section 104 includes a scaling ratio calculating section 104a, a scaling section 104b, a trimming process section 104c, and an image synthesis process section 104d. The image generating section 104 performs image generation for realizing the multi-shop copy.

The image forming section 105 includes: the image forming stations having the exposure units 1a to 1d, the developer units 2a to 2d, the photoconductor drums 3a to 3d, the cleaner units 4a to 4d, and the chargers 5a to 5d; and the fixing unit 8. The image forming section 105 transfers and fixes the toner images onto the sheet transported by the transfer belt 70 to thereby form a color image.

The operation panel 120 is connected to the input and output interface 160. Information related to selections and instructions by the user is inputted by the keys and the touch keys disposed on the operation panel 120 through the input and output interface, and information that the user is to be notified of is outputted through the input and output interface 106 to be displayed on the LCD 130.

The storage section 107 is, for example, storage means such as an HDD or a nonvolatile memory. Part of the storage area thereof is used as a program storage area 107a, a table storage area 107b, an original image storage area 107c, a set condition storage area 107d, and a scaled-image storage area 107e.

FIG. 9 is a conceptual diagram showing an example of a table T that defines the arrangement of the multi-shot image. This table T is stored in the table storage area 107b of the storage section 107. In the table T shown in FIG. 9, the arrangements of the scaled images are defined for each number of documents having been read and each number of multi-shot images. For example, when the number of documents having been read is one and the number of multi-shot images is two to four, the number of divisional areas is four, the basic scaling ratio is 50%, and the arrangement is adopted such that one sheet is divided into two in the longitudinal direction and divided into two in the lateral direction. When the number of documents having been read is two and the number of multi-shot images is one, although the number of areas is four and the basic scaling ratio is 50% as in the above-described case, since one multi-shot image is generated from each document, only the upper half of the divisional areas is used.

The arrangement of the scaled images can be easily changed by editing the table T. To edit the table T, for example, the operation panel 120 is used. When a larger number of documents than the maximum number that can be disposed within one sheet are set, for the documents that cannot be disposed within the sheet, an optimum arrangement can be newly automatically determined based on the table T.

Figure 10:
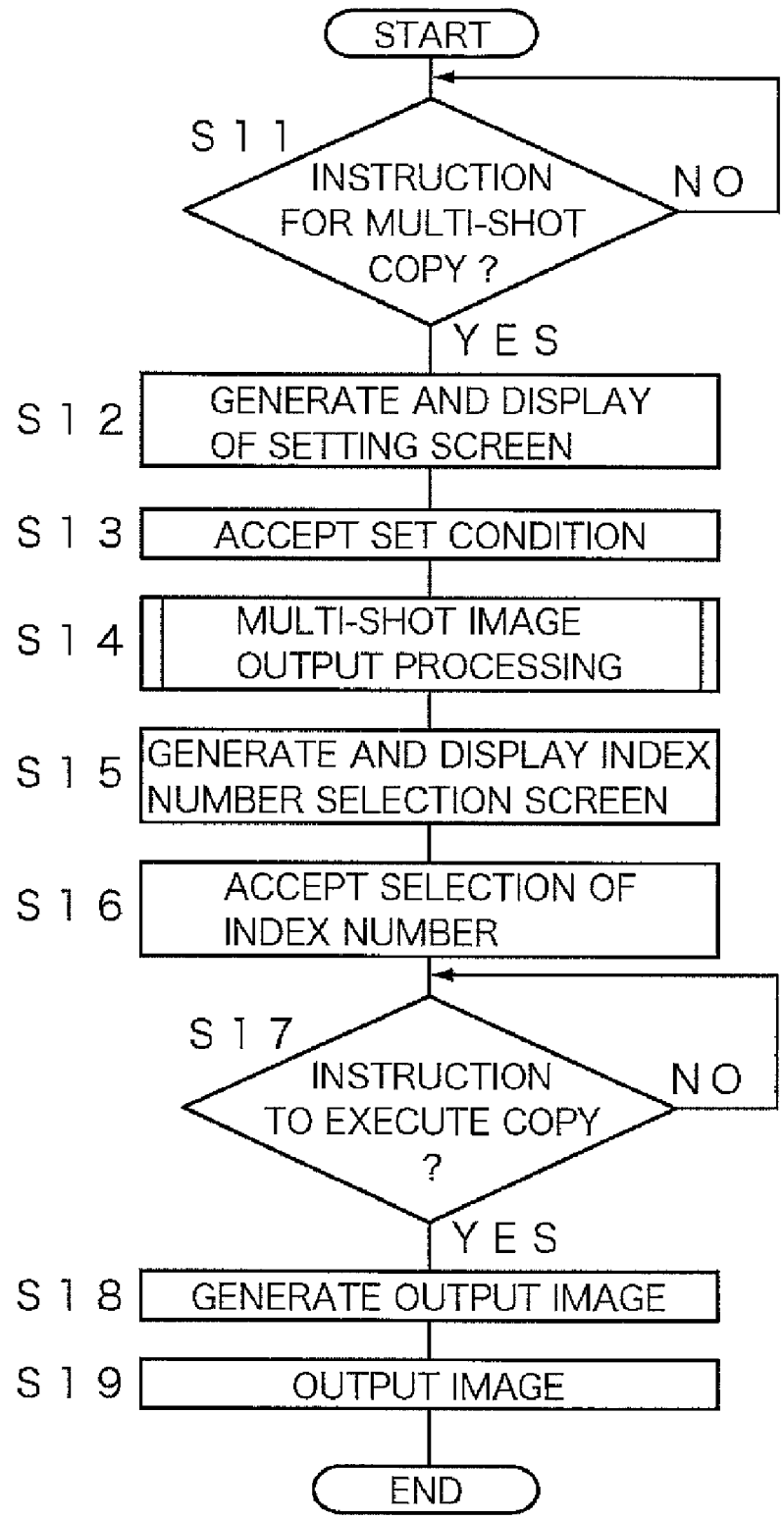
FIG. 10 is a flowchart for explaining the procedure of processing performed by the image forming apparatus according to the present embodiment.

The procedure of the processing of the image forming apparatus when multi-shot copying is performed will be described. FIG. 10 is a flowchart for explaining the procedure of the processing performed by the image forming apparatus according to the present embodiment. First, the image forming apparatus determines whether an instruction to execute multi-shot copying is provided or not (step S11). When no instruction to execute multi-shot copying is provided (S11: NO), the image forming apparatus waits until an execution instruction is provided.

When the multi-shot copy key 126 disposed on the operation panel 120 or the touch key 131 disposed on the LCD 130 is pressed, determining that an instruction to execute multi-shot copying is provided (S11: YES), the image forming apparatus generates a setting screen (the multi-shot setting screen 210 shown in FIG. 3A), and displays it on the LCD 130 (step S12).

Then, the image forming apparatus accepts various set conditions on the multi-shot setting screen 210 (or 220) (step S13). The accepted set conditions are stored in the set condition storage area 107d.

Then, the image forming apparatus performs multi-shot image output processing described later (step S14), and outputs a multi-shot copy as shown in FIG. 4 or 6. The image (original image) read by the image reading section 103 at this time is stored in the original image storage area 107c in the storage section 107, and the generated scaled image is stored in the scaled-image storage area 107e.

After outputting the multi-shot copy, to make the user select a desired scaling ratio, the image forming apparatus generates the index number selection screen 240 (or 250) as shown in FIG. 7, and displays it on the LCD 130 (step S15). Then, the image forming apparatus accepts the selection of the index number on the displayed index number selection screen 240 (step S16), and determines whether an instruction to execute copying is provided or not (step S17). The determination as to whether an instruction to execute copying is provided or not is made by determining, for example, whether the copy execution key 245 of the index number selection screen 240 (the copy execution key 258 of the index number selection screen 250) is pressed or not. When no instruction to execute copying is provided (S17: NO), the image forming apparatus waits until an instruction to execute copying is provided.

When determining that an instruction to execute copying is provided (S17: YES), the image forming apparatus generates an output image by using the scaling ratio corresponding to the index number selected by the user (step S18), and forms the image after the transformation of the scaling ratio on the sheet to thereby output the generated image (step S19).

Figure 11:
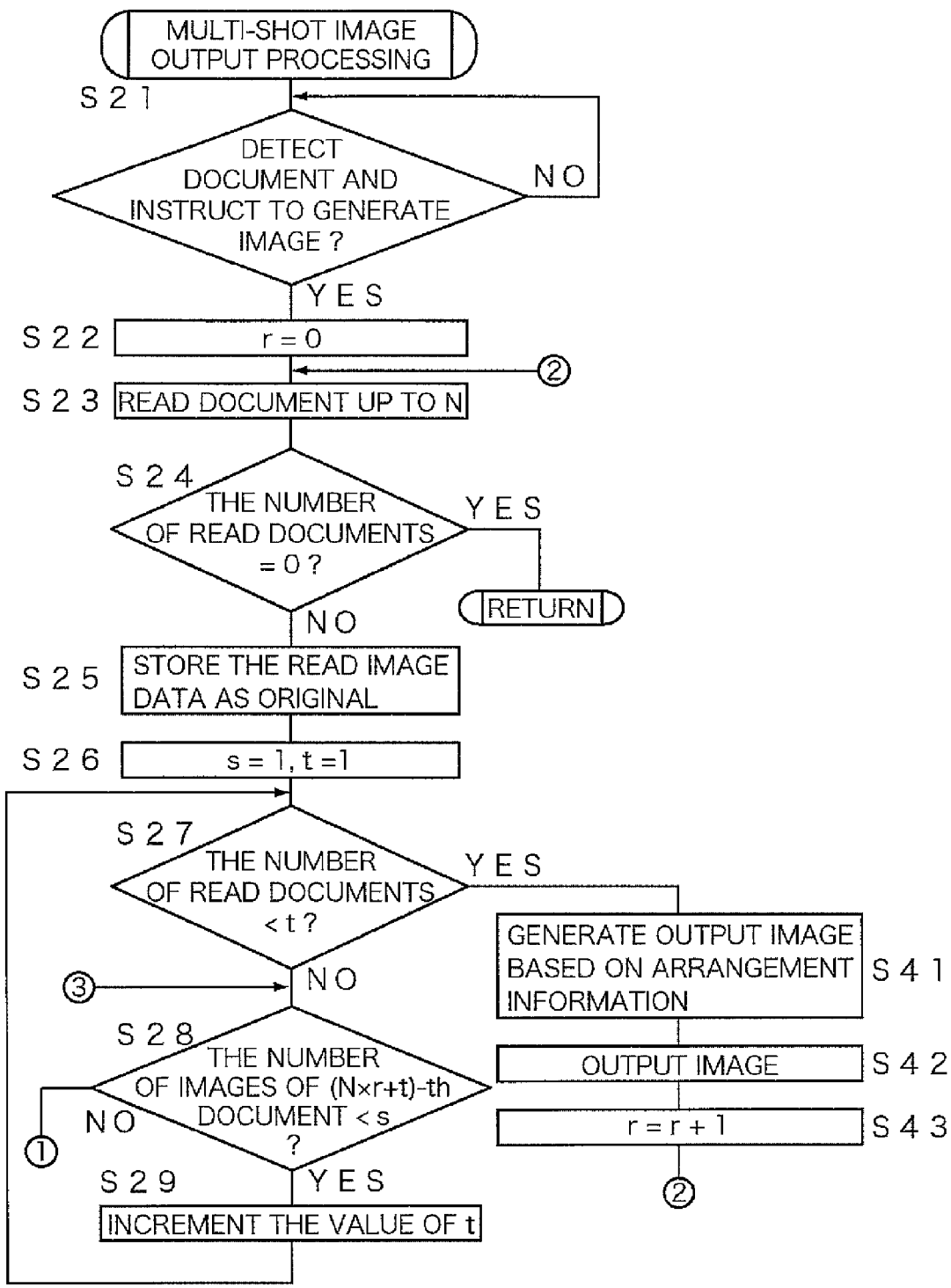
FIG. 11 is a flowchart showing the procedure of multi-shot image output processing.
Figure 12:
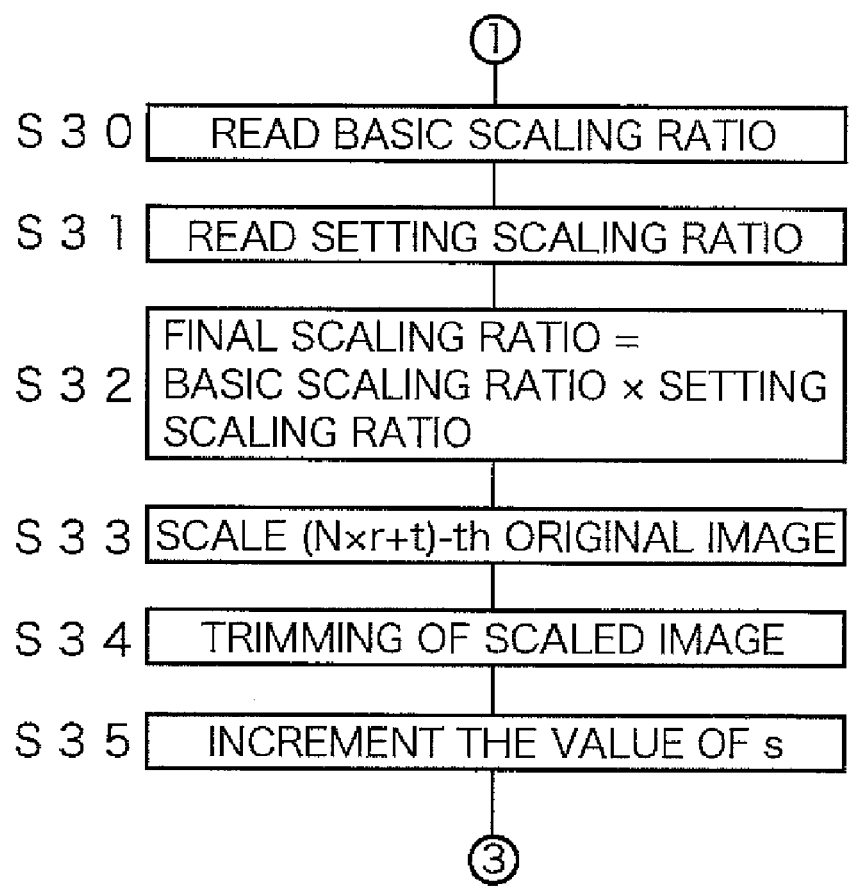
FIG. 12 is a flowchart showing the procedure of the multi-shot image output processing.

FIGS. 11 and 12 are flowcharts showing the procedure of the multi-shot image output processing. First, the image forming apparatus detects the document placed on the document plate 21 or the document set in the double-sided automatic document feeder 22 by a document detector (not shown), and determines whether an instruction to generate an image is provided or not (step S21). When no document is detected or when no instruction to generate an image is provided (S21: NO), the image forming apparatus waits until a document is detected and an instruction to generate an image is provided.

When a document is detected and an instruction to generate an image is provided (S21: YES), the image forming apparatus sets a non-illustrated counter at r=0 (step S22), and reads up to a number, N, of documents (for example, N=4) (step S23). When no document to be read is left before a number, N, of documents are read, the image forming apparatus advances the process to the next step.

Then, the image forming apparatus determines whether the number of documents having been read is zero or not (step S24). When determining that the number of documents having been read is zero (S24: YES), the image forming apparatus ends the processing of this flowchart.

When the number of documents having been read is equal to or more than one (S24: NO), the image forming apparatus stores the image data having been read, as the original in the original image storage area 107c in the storage section 107 (step S25). Then, the image forming apparatus sets non-illustrated counters at s=t=1 (step S26).

The image forming apparatus determines whether the number of documents having been read is smaller than t or not (step S27). When determining that the number of documents having been read is equal to or more than t (S27: NO), the image forming apparatus determines whether the number of images of the (N×r+t)-th document (number of multi-shot images) is smaller than s or not (step S28). When the number of images of the (N×r+t)-th document is smaller than s (S28: YES), the image forming apparatus increments the value of t by one (step S29), and then, returns the process to S27.

When the number of images of the (N×r+t)-th document is equal to or more than s (S28: NO), the image forming apparatus reads the basic scaling ratio from the table T stored in the table storage area 107b in the storage section 107 (step S30), and reads the set scaling ratio from the set condition storage area 107d (step S31).

Then, the image forming apparatus multiplies the basic scaling ratio by the set scaling ratio by the scaling ratio calculating section 104a to thereby calculate the final scaling ratio (step S32), and scales the (N×r+t)-th original image stored in the original image storage area 107c, by using the calculated final scaling ratio (step S33). Then, the image forming apparatus trims the scaled image by using a trimming size of the basic scaling ratio×the sheet size (step S34), increments the value of s by one (step S35), and then, returns the process to step S28.

At step S27, when determining that the number of documents having been read is smaller than t (S27: YES), the image forming apparatus reads the multi-shot image arrangement information from the table T stored in the table storage area 107b, arranges and synthesizes the scaled images by the image synthesis process section 104d based on the arrangement information, adds the index number starting from one and the set scaling ratio information to the synthesized data for each scaled image, and generates an output image (step S41). The generated output image is transferred to the image forming section 105, and the image is outputted (step S42). Then, the image forming apparatus increments the value of r by one (step S43), and returns the process to step S23.

In the present embodiment, the image data of the document that is read at step S23 is stored as the original data. However, when the number of documents is equal to or more than four, since the processing of step S25 is performed a plurality of number of times, more memory is used. Therefore, the original data may be erased after multi-shot copying is performed according to the specifications of the mounted system. In this case, however, it is necessary for the user having performed multi-shot copying of four or more documents at one time to confirm the desired scaling ratio by checking the print result of the multi-shot copying and then, perform normal copying after inputting the scaling ratio with the touch key 135 related to the scaling ratio setting.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus comprising:
   an image reading section for reading an image from one or a plurality of documents;
   an image generating section for generating a plurality of images of different scaling ratios from the image read by the image reading section;

an information adding section for adding an index which identifies each image generated by the image generating section and information related to the scaling ratio of each image, to the image to be formed on the sheet;

an image forming section for forming the plurality of images to which respective indexes and the information related to the scaling ratio are added by the information adding section;

a display section for displaying the index of each image formed by the image forming section on the sheet;

an accepting section for accepting a selection of one index from the indexes displayed on the display section; and a switching section configured to switch between a function of generating the plurality of images of the different scaling ratios from one document on one sheet and a function of generating the plurality of images of the different scaling ratios from a plurality of documents on one sheet, wherein the image forming section forms on one sheet an image identified by the index selected through the accepting section.

2. The image forming apparatus according to claim 1, wherein
the accepting section accepts a setting related to scaling ratios and a number of images to be formed on one sheet, and wherein
the image forming section forms the plurality of images of the different scaling ratios based on the setting accepted by the accepting section.

3. The image forming apparatus according to claim 1, further comprising:
a setting section for setting a scaling ratio for each document to be read, wherein
the image generating section enlarges or reduces the image read from each document based on the scaling ratio set by the setting section.

4. The image forming apparatus according to claim 1, wherein
the accepting section accepts a setting related to a number of documents, the scaling ratios, and a number of images to be formed on one sheet, wherein
the image forming section forms the plurality of images of the different scaling ratios based on the setting accepted by the accepting section.

5. The image forming apparatus according to claim 1, further comprising:
a table that defines an arrangement of the plurality of images on the sheet, wherein
the image forming section forms the plurality of images on one sheet according to the arrangement defined by the table.

6. An image forming apparatus comprising:
image reading means for reading an image from one or a plurality of documents;
image generating means for generating a plurality of images of different scaling ratios from the image read by the image reading means;
information adding means for adding an index which identifies each image generated by the image generating means and information related to the scaling ratio of each image, to the image to be formed on the sheet;
image forming means for forming the plurality of images to which respective indexes and the information related to the scaling ratio are added by the information adding means;
display means for displaying the index of each image formed by the image forming means on the sheet;

accepting means for accepting a selection of one index from the indexes displayed on the display means; and switching means configured to switch between a function of generating the plurality of images of the different scaling ratios from one document on one sheet and a function of generating the plurality of images of the different scaling ratios from a plurality of documents on one sheet, wherein the image forming means forms on one sheet an image identified by the index selected through the accepting means.

7. The image forming apparatus according to claim 6, wherein
the accepting means accepts a setting related to scaling ratios and a number of images formed on one sheet, and wherein
the image forming means forms the plurality of images of the different scaling ratios based on the setting accepted by the accepting means.

8. The image forming apparatus according to claim 6, further comprising:
setting means for setting a scaling ratio for each document to be read, wherein
the image generating means enlarges or reduces the image read from each document based on the scaling ratio set by the setting means.

9. The image forming apparatus according to claim 6, wherein
the accepting means accepts a setting related to the number of documents, the scaling ratios, and a number of images to be formed on one sheet, and wherein
the image forming means forms the plurality of images of the different scaling ratios based on the setting accepted by the accepting means.

10. The image forming apparatus according to claim 6, further comprising:
a table that defines an arrangement of the plurality of images on the sheet, wherein
the image forming means forms the plurality of images on one sheet according to the arrangement defined by the table.

11. A recording medium storing thereon a computer program executable to perform the steps of:
generating a plurality of images of different scaling ratios from an inputted image;
adding an index which identifies each image generated in the generating step and information related to the scaling ratio of each image, to the image to be formed on the sheet;
forming the plurality of generated images to which respective indexes and information related to the scaling ratio are added in the adding step;
displaying the index of each image formed in the forming step on the sheet;
accepting a selection of on index from the indexes displayed in the displaying step; and
switching between a function of generating the plurality of images of the different scaling ratios from one document on one sheet and a function of generating the plurality of images of the different scaling ratios from a plurality of documents on one sheet,
wherein the forming step forms on one sheet an image identified by the index selected through the accepting step.

* * * * *